March 6, 1962  E. RONDTHALER  3,023,956
MONEY CONVERTER

Filed July 9, 1958  2 Sheets-Sheet 1

INVENTOR.
EDWARD RONDTHALER
BY
ATTORNEY

March 6, 1962 E. RONDTHALER 3,023,956
MONEY CONVERTER
Filed July 9, 1958 2 Sheets-Sheet 2

INVENTOR.
EDWARD RONDTHALER
BY
ATTORNEY

United States Patent Office 3,023,956
Patented Mar. 6, 1962

3,023,956
MONEY CONVERTER
Edward Rondthaler, 28 Nordica Drive,
Croton on Hudson, N.Y.
Filed July 9, 1958, Ser. No. 747,535
6 Claims. (Cl. 235—89)

The subject matter of this invention relates to foreign money exchange and evaluation, and has for its objective the creation of a computation device by which the value of one currency can be determined in terms of another currency foreign to it, and whether the offered rate of exchange of the latter currency for the former is normal and fair, in accordance with recognized rates of exchange, and, if not, to the extent to which it deviates from such recognized rates of exchange.

The extent of foreign travel has been increasing, in recent years, to vast proportions, with many thousands of persons annually making trips abroad from the United States to foreign lands, and many thousands of persons coming to the United States from foreign countries, either on matters of business, visitation, vacations and general travel purposes. Since each country has its own type of currency, which is different from that of other countries, the need arises to exchange the traveler's currency into the currency of the realm in which he finds himself. As is obvious, the rate of exchange of one type of currency for another is frequently confusing, made more so by fluctuations in the rate of exchange. It therefore becomes necessary to effectuate some means whereby the value of one type of currency in terms of another may be quickly, efficiently and accurately ascertained, so as to guard against any loss as a result of poor exchanges, and also to enable the traveler to take advantage of profitable offers of exchange.

The principal object of my invention, therefore, is the provision of a money converter device which will enable the traveler to ascertain the comparable value of a currency foreign to his own, for purposes of exchange.

Another important object of my invention is the provision of a money converter device which will enable its user to determine whether the rate of exchange of foreign currency for his own offered by one medium is more advantageous than that offered by another exchange medium.

A third important object of my invention is the provision of a money converter device that will facilitate determination of the value of a purchase made in a foreign country at a price set in the foreign currency, in terms of the traveler's native currency.

Still another important object of my invention is the creation of a money converter device whereby the value of any selected amount of the user's native currency can be quickly and easily ascertained in terms of any designated foreign currency.

A further important object of my invention is the creation of a money converter device which is compact, small and easy to refer to as well as convenient to carry.

Other important and salient objects, advantages and functional features thereof will be more readily appreciated from an examination of the detailed specification herein, taken with the accompanying drawings, wherein.

Similar reference characters designate similar parts throughout the different views.

In the embodiment shown and hereinafter described, the money converter has been arranged to show and determine the values of various foreign currencies in terms of United States currency, and the invention will be described on this basis. However, it is to be understood that modification is intended and may be made so that the currency of any country may be ascertained in terms of other currencies foreign to the former, as will hereinafter be explained.

Figures 1, 2:
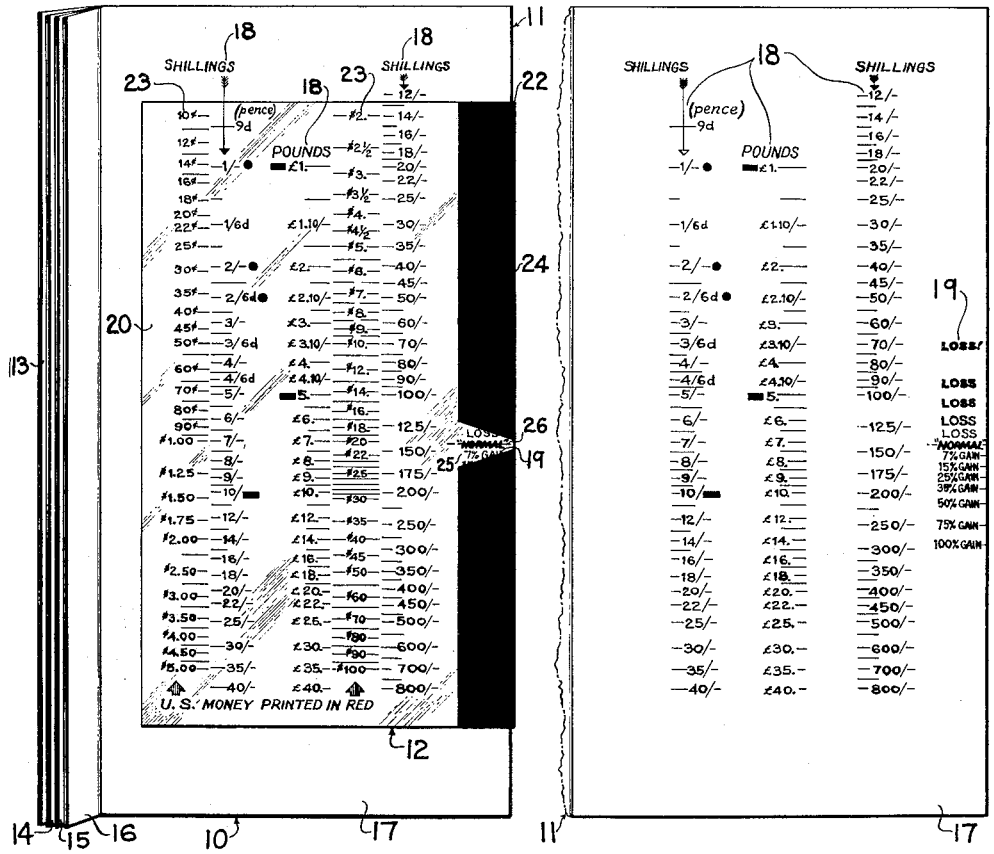
FIG. 1 is a top, perspective view of a preferred embodiment of my money converter, exposing one page thereof with the transparent slide secured thereto.
FIG. 2 is a top view of the page shown in FIG. 1, with the transparent slide removed.
Figure 3:
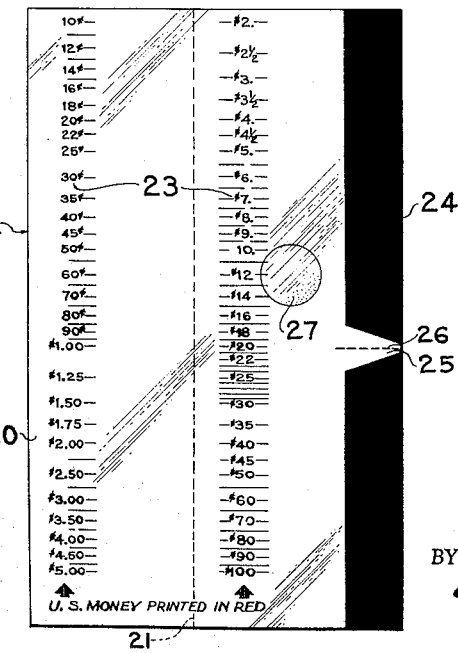
FIG. 3 is a top view of the transparent slide shown in FIG. 1.
Figure 4:
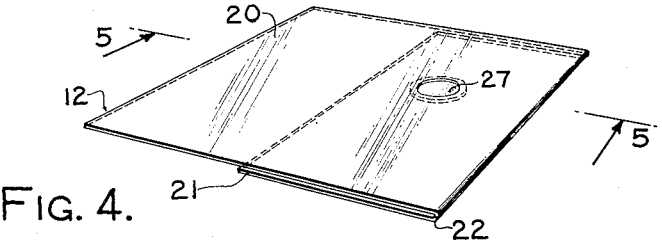
FIG. 4 is a side, perspective, reduced view of the transparent slide shown in FIG. 3.
Figure 5:
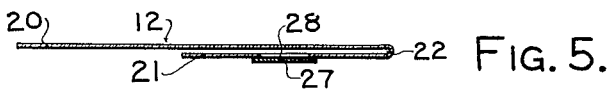
FIG. 5 is a cross-sectional view, taken on lines 5—5 of FIG. 4.

Referring now to the embodiment shown in FIGS. 1–3, the money converter 10 comprises in combination a book 11 and a transparent slide 12. The book 11 may be of any convenient size, pocket or larger, and is composed of a plurality of pages 13–17, bound together. The number of pages to the book 11 will vary in accordance with the number of foreign currencies involved, each page thereof allocated to one foreign currency. For example, assuming that the money converter 10 is to be made for the exchange of United States currency to European currencies, and the currencies of 20 foreign countries are involved, the book 11 will carry a minimum of 20 leaves or pages, one for each country's currency tabulation.

Each of the pages 13–17 is constructed of paper or other suitable material, and is imprinted on its right side face with a progressive tabulation or scale of one country's currency. For example, in FIGS. 1 and 2 the currency of Great Britain is imprinted on page 17 in a tabulation 18 of pre-selected arrangement of progressive valuation, in pence, shillings and pounds. To the right of this tabulation 18 there is imprinted a pre-arranged variance schedule 19, showing "losses," "percentage gains" and "normal," for purposes to be hereinafter explained.

The transparent slide 12 comprises a front section 20 and a rear section 21, formed by folding the slide 12, as shown, to form a bead or shoulder 22, which is adapted to act as a bearing for movement of the transparent slide 12 when the latter is mounted upon one of the pages of the book 11. As shown by FIG. 1, the slide 12 is mounted on page 17 so that the front section 20 rests upon the page 17 while the rear section 21 rests against the back of page 17, so that the bead 22 acts as a bearing against the edge of page 17, permitting the slide 12 to be moved vertically along the page 17.

The transparent slide 12 has imprinted upon its front section 20 a progressive tabulation 23 of United States currency in a progressive evaluation in a pre-selected manner similar to the arrangement of the tabulation 18, arranged so as to come in registry with the tabulation 18 when the transparent slide 12 is mounted upon the page 17 in the manner described, and to come in registry with similar tabulations on pages 13, 14, 15 and 16 of book 11, as will be shown. All of the tabulations, such as 18, and schedules 19, on pages 13–17 of the book 11 are in one color of ink, such as black ink, while the tabulation 23 on the transparent slide 12 is in a distinctive color of ink, such as "red," so as to provide rapid and ready recognition as to which tabulation the figures apply when the transparent slide 12 is mounted upon a page of the book 11.

To the right of the tabulation 23 the slide 12 is provided with an opaque area 24 disposed to cover the schedule 19 when the slide 12 is mounted upon the page 17. The opaque area 24 is provided intermediately with a transparent gap 25 having an indicator 26, through which the schedule 19 may be seen when mounted as above indicated.

The rear section 21 of the slide 12 is provided with an adhesive tab 27 secured to an opening therein, arranged so that the adhesive surface 28 of the tab 27 faces the rear surface of front section 20 of the slide 12.

In the operation of the money converter 10, the transparent slide 12 is mounted upon a pre-selected page of the book 11 so that it is vertically slidable along the edge of the page, with its bead 22 flush against the edge of the page. When it arrives at a pre-selected position upon the page the transparent slide 12 is firmly secured to the page in said position by applying pressure to the adhesive tab 27 so that the adhesive surface 28 sticks to the rear surface of the page. When it is desired to remove the slide 12 from this position, the rear section 21 of the slide 12 is pulled away from the rear surface of the page until the adhesive surface 28 parts therefrom.

Coming now to the operation of the money converter 10, let us assume that a visitor from the United States has arrived in England and desires to convert United States currency into English currency. He finds that in the foreign exchange rate the value of the pound sterling is $2.80 in United States currency, or ten English pounds for $28.00. He takes his money converter 10 and opens the book 11, turning to page 17, which bears the English currency tabulation 18. He then takes the transparent slide 12 and mounts it upon page 17 until the bead or shoulder 22 is flush up against the edge of page 17. Using the shoulder 22 as a bearing he moves the slide 12 vertically along the page 17 until the line for the figure $28.00 on tabulation 23 coincides with the line for the figure £10 (pounds) on tabulation 18, and secures the slide 12 firmly to the page 17 in this position by pressing against the adhesive tab 27. This is the "normal" rate of exchange, as shown by the indicator 26. For every $28.00 he should receive 10 pounds sterling, in English currency. This applies to all values of currency exchange. The money converter shows, for every valuation in United States currency up to $100.00, the equivalent value in English pounds, shillings and pence, adjacent thereto. Should the traveler receive, let us say, 9 pounds sterling for his $28.00, he knows that he is losing by the exchange. Should he be offered 11 pounds sterling for his $28.00, he is profiting thereby. By lossening and moving the slide 12 to where the figure of $28.00 on tabulation 23 coincides with the figure of 11 pounds on the tabulation 18, the user will note the percentage of profit made by the exchange.

In a further application of the money converter 10, let us assume that the United States visitor to England wishes to make a purchase there and pay for the purchase in United States currency, or travelers' checks. The article he wishes to purchase is priced at 2 pounds, 10 shillings (£2 10/). Referring to the money converter 10, where the slide 12 is set at "normal" rate of exchange, as above first indicated, he finds that the equivalent price in United States currency is $7.00, and pays accordingly.

Figure 6:
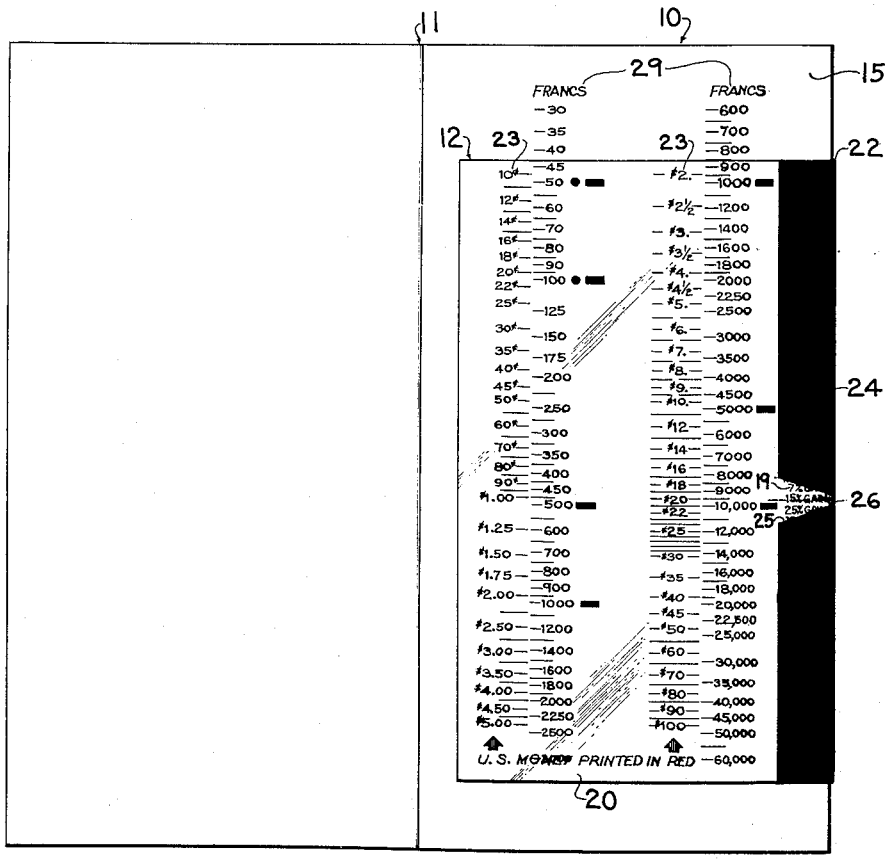
FIG. 6 is a top view of another page of the book shown in FIG. 1, with the transparent slide secured thereto.

In FIG. 6 there is shown page 15 of the book 11, whereon is imprinted in similar fashion the tabulation 29 of French currency used in France and Monaco. Assume the traveler from the United States is now in France and wishes to exchange United States currency or travelers' checks for French money. He finds that the exchange rate is normally 400 francs for $1.00, etc. By setting the transparent slide 12 upon page 15 so that the figure $1.00 on the tabulation 23 coincides with the figure 400 on the tabulation 29, the traveler knows how many francs he should obtain for each $1.00 of United States currency. Should he be offered 500 francs for $1.00, by moving the slide 12 so that figure $1.00 on tabulation 23 coincides with figure 500 on tabulation 29, the indicator 26 will show him the percentage of profit made by the exchange. Likewise, should the traveler wish to purchase an article priced in francs with United States currency, the money converter 10 will indicate the equivalent price in United States currency.

As is obvious, modifications of the money converter 10 may be made so that the basic currency for exchange is English, to be converted into French, Spanish, Italian or other foreign currency. In such modification the tabulation 18 would be in the slide 12, while the tabulation 29, etc., would be on the pages of book 11. Similar modifications may be made for travelers from any country to countries foreign to him.

The left side pages of the book 11, otherwise unused, may be utilized for imprinting thereon various data of interest and use to the traveler or tourist, in connection with each particular country, such as recommended percentages or amounts for tipping in restaurants, to employees of hotels and taxi drivers, the customs of the country, the weights and measures used, etc.

As a modification thereof, the device may be made so that tabulations susceptible of comparative evaluations, other than of currency, may be substituted for the tabulations 18 and 23, to find and define the comparative evaluation of the units of one tabulation in terms of the other.

As a further modification, of the device, the slide 12 may be made narrower and opaque, with a tabulation imprinted along the edge opposite the bead 22, adapted to come in registry with a tabulation on the page upon which the slide 12 is mounted.

The embodiments shown and described, therefore, are by way of illustration only, and various changes may be made in the construction, combinations and arrangement of parts without limitation upon or departure from the spirit and scope of the invention, or sacrificing any of the advantages thereof inherent therein.

Having described my invention, I claim:

1. A device of the class described comprising in combination a book provided with a plurality of pages each of which having imprinted thereon a different tabulation in vertical rows, and a transparent slide folded over to comprise a front section and a rear section, the slide adapted to be mounted upon any page of the book so that the fold acts as a bearing for the slide against the edge of the page to allow vertical movement of the slide along the page, the front section of the slide having imprinted thereon a tabulation in vertical rows different from any on the book pages and adapted to come in registry with the tabulation on the page on which the slide is mounted, at a pre-selected position of the slide upon the page, to define between them the comparative values of the respective tabulations in terms of one another, each of the pages of the book having imprinted thereon a vertical variance schedule adjacent its tabulation, and the front section of the slide provided with an opaque surface adapted to cover the variance schedule when the slide is mounted on the page, the opaque surface being further provided intermediately with a transparent gap having an indicator, whereby different sections of the variance schedule are alternately made visible through the gap by vertical movement of the slide along the page.

2. A device, according to claim 1, the rear section of the slide being provided with adhesive means to detachedly secure the slide to the page at preselected positions.

3. A money converter comprising in combination a book provided with a plurality of pages each of which having imprinted thereon the tabulation of a different foreign currency in vertical rows, and a transparent slide folded over to comprise a front section and a rear section, the slide adapted to be mounted upon any page of the book so that the fold acts as a bearing for the slide against the edge of the page to allow vertical movement of the slide along the page, the front section of the slide having imprinted thereon a currency tabulation, in vertical rows, of a country different from any on the book pages, adapted to come in registry with the tabulation on the page on which the slide is mounted, at a pre-selected position of the slide upon the page, to define between them the comparative values of the respective currencies in terms of one another, each of the pages of the book having imprinted thereon a vertical variance schedule adjacent its tabulation, and the front section of the slide provided with an opaque surface adapted to cover the variance schedule when the slide is mounted on the page, the opaque surface being further provided intermediately with a transparent gap having an indicator, whereby different sections of the variance schedule are alternately made visible through the gap by vertical movement of the slide along the page.

4. A money converter, according to claim 3, the rear section of the slide being provided with adhesive means to detachedly secure the slide to the page at preselected positions.

5. A money converter comprising in combination a book provided with a plurality of pages each of which having imprinted thereon the tabulation of a different foreign currency in vertical rows and a vertical variance schedule adjacent thereto, and a transparent slide folded over to comprise a front section and a rear section, the slide adapted to be mounted upon any page of the book so that the fold acts as a bearing for the slide against the edge of the page to allow vertical movement of the slide along the page, the front section of the slide having imprinted thereon a tabulation of United States currency in vertical rows adapted to come in alignment with the tabulation on the page on which the slide is mounted, at a pre-selected position of the slide upon the page, to define between them the comparative values of the respective currencies in terms of one another, the slide being further provided with an opaque surface adjacent the tabulation and adapted to cover the variance schedule when the slide is mounted on the page, the opaque surface being provided intermediately with a transparent gap having an indicator through which different sections of the variance schedule are alternately made visible by vertical movement of the slide along the page.

6. A money converter, according to claim 5, the rear section of the slide being provided with adhesive means to detachedly secure the slide to the page at preselected positions.

References Cited in the file of this patent

UNITED STATES PATENTS

| | | |
|---|---|---|
| 888,020 | Kennedy | May 19, 1908 |
| 1,336,900 | Galloway | Apr. 13, 1920 |
| 2,152,604 | Perry | Mar. 28, 1939 |
| 2,487,590 | Rehill | Nov. 8, 1949 |
| 2,684,202 | Guintini | July 20, 1954 |

FOREIGN PATENTS

| | | |
|---|---|---|
| 109,107 | Great Britain | Sept. 6, 1916 |
| 350,864 | Great Britain | June 18, 1931 |